(No Model.)

S. SLOAN.
DEVICE FOR CONVERTING MOTION.

No. 483,177. Patented Sept. 27, 1892.

Witnesses.
Henry Ford
W. A. Biddle

Inventor.
S. Sloan
by W. H. Burridge
Atty.

UNITED STATES PATENT OFFICE.

SEXTUS SLOAN, OF PAINESVILLE, OHIO.

DEVICE FOR CONVERTING MOTION.

SPECIFICATION forming part of Letters Patent No. 483,177, dated September 27, 1892.

Application filed February 12, 1892. Serial No. 421,234. (No model.)

*To all whom it may concern:*

Be it known that I, SEXTUS SLOAN, a citizen of the United States, residing at Painesville, in the county of Lake and State of Ohio, have invented certain new Improvements in a Device for Converting Motion, of which the following is a full, clear, and complete description.

The nature of my invention relates to an improved means for converting reciprocating motion into rotary motion, as hereinafter fully shown and explained.

That others acquainted with the arts may fully see and understand the invention, reference will be had to the following specification and annexed drawings, forming part thereof.

Figure 1:
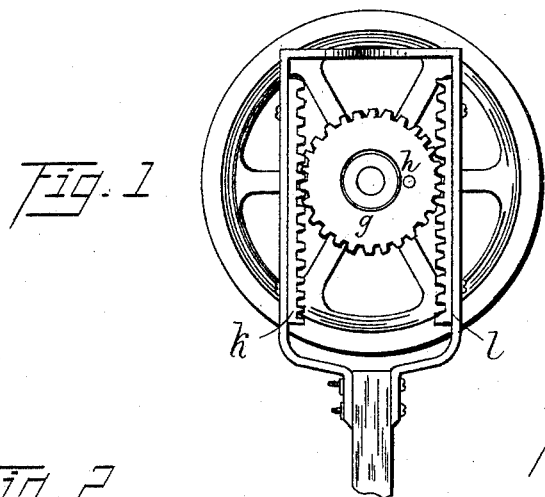
Figure 2:
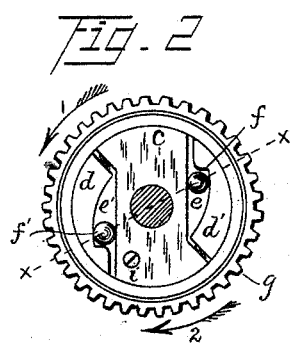
Figure 3:
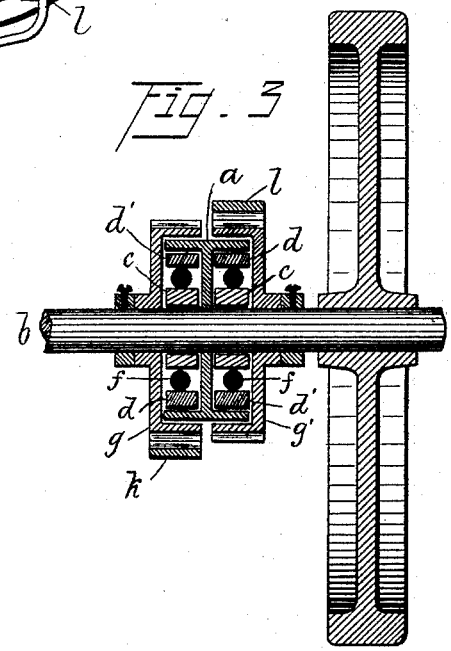
Figure 4:
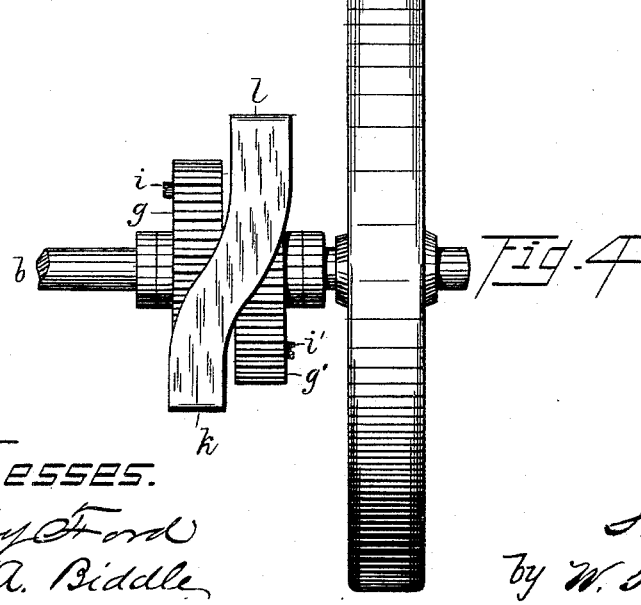

Figure 1 is a side view of my invention as applied to a rotative shaft. Fig. 2 is an enlarged detached section or interior view showing parts pertaining to the invention and hereinafter described. Fig. 3 is an enlarged cross-section of my invention applied to a rotative shaft. Fig. 4 is an enlarged end view of my invention applied to a shaft.

Like letters of reference designate like parts in the drawings and specification.

Referring to Fig. 3, a disk $a$ will be found with its periphery extending on each side. The disk $a$ is rigidly attached to the shaft $b$ by any known means, as a key. By the extensions of the periphery of the disk $a$ two interior chambers are formed, circumscribing the shaft. Within each of these chambers and loose on the shaft $b$ is a plate $c$ of the form shown in Fig. 2, and also two plates $d$ $d'$ of the form shown and arranged as shown in Fig. 2, thus leaving the wedge-shaped cavities $e$ $e'$ on each side of the plate $c$. Within each of these wedge-shaped cavities is a ball $f$ $f'$. The balls $f$ $f'$ fit loose in the large part of the wedge-shaped cavities $e$ $e'$. Two geared caps or covers $g$ $g'$ are fitted loosely on the shaft $b$. Said geared covers incase the two chambers containing the plates $c$ $d$ $d'$ and the balls $f$ $f'$. Each one of the said covers is provided with a hole $h$, Fig. 1, to admit the heads of the screws or lugs $i$ $i'$, Figs. 2 and 4. The screws or lugs $i$ $i'$ are rigidly attached to the plates $c$. A frame is attached to the connecting-rod, or it may be a part of any device where it is desired to produce a reciprocating motion. Said frame contains two racks $k$ and $l$, Figs. 1, 3, and 4. The frame is so arranged that the rack $l$ will engage the teeth of the geared cover $g'$ and the rack $k$ will engage the teeth of the geared cover $g$. These double racks may be made of any suitable material. The plate $c$, having the rigid screw or lug $i$ passing through the hole in the geared cover $g$, must necessarily revolve when said cover revolves. The corresponding plate must certainly revolve when the geared cover $g'$ revolves for the same reason. It will readily be seen that when the cover $g$ is revolving in the direction of arrow 1 the plate $c$ will press on the terminals of the plates $d$ and $d'$, causing them all to revolve freely on the shaft $b$; but when said cover is revolving in the direction of arrow 2 the plate $c$ will bear on the balls $e$ and $e'$, which will cause the plates $d$ and $d'$ to bind on the inside of the extended periphery of the rigid disk $a$, necessitating the revolution of the shaft $b$ therewith, as the disk $a$ is, as hereinbefore stated, rigidly attached to said shaft. To cause the shaft $b$ to revolve in the same direction on one movement of the rack-frame as it does on the reverse movement, the plates $c$, $d$, and $d'$ and the balls $e$ and $e'$ are arranged in the chamber incased by the cover $g$, just the reverse to what they are in the cover $g'$. Consequently when the case $g$ is revolving loosely on the shaft the case $g'$ is engaged, and vice versa. One case is engaged on the stroke in one direction and the opposite case is engaged on the reverse stroke, thereby causing the shaft $b$ to revolve continuously in the same direction.

This device may be applied in any case where a reciprocating motion is desired. Take, for instance, the application on a sewing-machine. The operator can start and stop the machine with the foot on the treadle at any point desired, as there is no dead-center to overcome.

Two disks with extending peripheries placed in juxtaposition to each other may be used in place of the disk $a$ and still not depart from the nature of my invention.

What I claim, and desire to secure by Letters Patent, is—

1. In a device for converting motion, a disk rigidly attached to the shaft, with the periphery thereof extending out each side, forming two annular chambers, in combination with the plates $c$, $d$, and $d'$ of the form shown, the balls $f$ and $f'$, two geared covers, and the rack-frame containing the two racks $l$ and $k$, and the plate $c$, provided with a rigid screw or lug $i$, arranged substantially in the manner set forth.

2. In a device for converting reciprocating motion, a rack-frame containing two racks $k$ and $l$, in combination with two geared covers $g$ and $g'$, arranged loosely on a shaft and operating alternately with the balls $f$ and $f'$, the plates $c$, $d$, and $d'$, and the corresponding balls and plates in the chamber in the manner described, whereby the shaft is caused to revolve in the same direction on one stroke of the frame as it does on the other, substantially as described.

In testimony whereof I affix my signature in presence of two witnesses.

SEXTUS SLOAN.

Witnesses:
 WALTER A. BIDDLE,
 HENRY FORD.